United States Patent [19]

Pearson et al.

[11] 4,107,777

[45] Aug. 15, 1978

[54] DISPENSING SYSTEM

[75] Inventors: Allen F. Pearson, Muskegon; Paul A. Mayo; Ronald N. Lorenz, both of Grand Blanc, all of Mich.

[73] Assignee: Anthes Imperial Limited, Rexdale, Canada

[21] Appl. No.: 805,874

[22] Filed: Jun. 13, 1977

Related U.S. Application Data

[63] Continuation of Ser. No. 619,318, Oct. 3, 1975, abandoned.

[51] Int. Cl.[2] .......................... G06F 15/56; B67D 5/08

[52] U.S. Cl. ....................................... 364/465; 222/26; 364/479; 364/521

[58] Field of Search ...................... 235/151.34; 222/14, 222/20, 26, 28; 364/465, 479, 521

[56] References Cited

U.S. PATENT DOCUMENTS

| | | | |
|---|---|---|---|
| 3,469,741 | 9/1969 | Bickford et al. | 222/20 X |
| 3,498,501 | 3/1970 | Robbins et al. | 222/26 |
| 3,731,777 | 5/1973 | Burke et al. | 222/26 X |
| 3,765,567 | 10/1973 | Maiocco et al. | 222/30 |
| 3,786,421 | 1/1974 | Wostl et al. | 340/149 A |
| 3,813,527 | 5/1974 | Langston | 235/151.34 |
| 3,847,302 | 11/1974 | Krone et al. | 222/14 |
| 3,858,758 | 1/1975 | May | 235/151.34 X |
| 3,894,658 | 7/1975 | Buell, Jr. | 235/151.34 X |
| 3,895,738 | 7/1975 | Buchanan et al. | 235/151.34 X |
| 3,897,887 | 8/1975 | Goldberg | 222/26 |
| 3,927,800 | 12/1975 | Zinsmeyer et al. | 222/26 |
| 3,931,497 | 1/1976 | Gentile et al. | 235/61.7 B |

*Primary Examiner*—Jerry Smith

*Attorney, Agent, or Firm*—Price, Heneveld, Huizenga & Cooper

[57] ABSTRACT

A dispensing system for controlling and displaying information regarding self-service operation of each of a plurality of fuel dispensers in a gasoline station includes, in one embodiment, an operator console having a CRT display displaying the status of each of the dispensers as well as current and previous sales data and a data entry keyboard for entry of sales and other data together with switch means for arming dispensers for self-service operation and for actuating the system for displaying selective dispenser information. The CRT and data entry keyboard are coupled to a central control unit which includes a programmed memory central processing unit for handling data between the central control unit and each of a plurality of dispensers as well as dispenser communications interface circuits. Each of the dispensers includes means for generating signals representative of the volume of gasoline pumped from the dispenser as well as circuit means for displaying volume and price data to the customer and means for coupling the dispenser to the central control unit for the actuation of the dispenser and transfer of data to the central control unit. In another embodiment, each of the dispensers further includes a central processing unit with a memory for controlling the computation of data at the dispenser and for transferring data between each of the dispensers and the central control unit.

22 Claims, 15 Drawing Figures

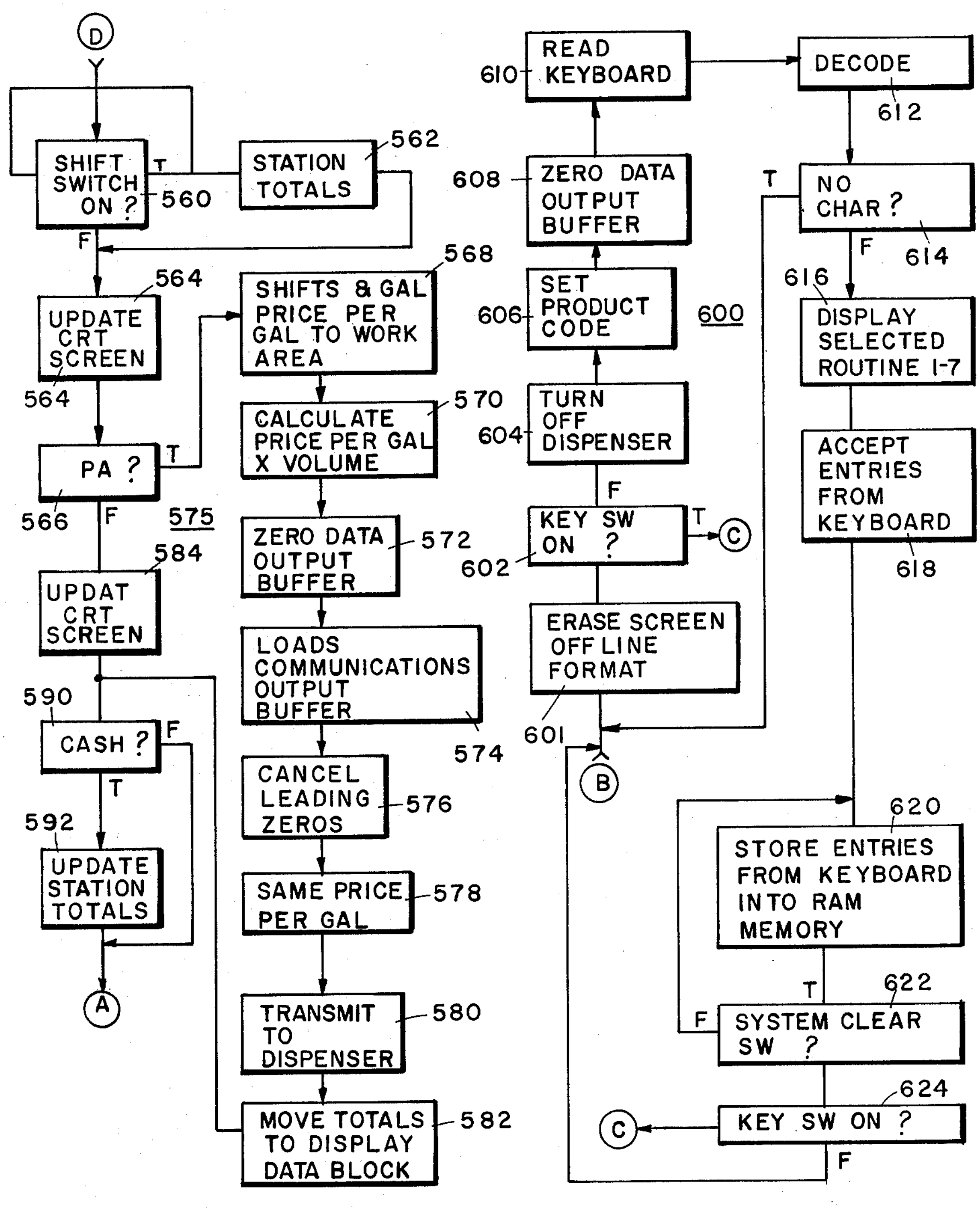
D
SHIFT SWITCH ON ?
560
T
STATION TOTALS
562
F
UPDATE CRT SCREEN
564
564
PA ?
566
T
SHIFTS & GAL PRICE PER GAL TO WORK AREA
568
F
575
CALCULATE PRICE PER GAL X VOLUME
570
ZERO DATA OUTPUT BUFFER
572
UPDAT CRT SCREEN
584
LOADS COMMUNICATIONS OUTPUT BUFFER
574
590
CASH ?
F
T
CANCEL LEADING ZEROS
576
592
UPDATE STATION TOTALS
SAME PRICE PER GAL
578
A
TRANSMIT TO DISPENSER
580
MOVE TOTALS TO DISPLAY DATA BLOCK
582
READ KEYBOARD
610
ZERO DATA OUTPUT BUFFER
608
SET PRODUCT CODE
606
600
TURN OFF DISPENSER
604
F
KEY SW ON ?
602
T
C
ERASE SCREEN OFF LINE FORMAT
601
B
DECODE
612
T
NO CHAR ?
614
F
616
DISPLAY SELECTED ROUTINE 1-7
ACCEPT ENTRIES FROM KEYBOARD
618
620
STORE ENTRIES FROM KEYBOARD INTO RAM MEMORY
T
622
F
SYSTEM CLEAR SW ?
624
C
KEY SW ON ?
F

DISPENSING SYSTEM

CROSS REFERENCE TO RELATED APPLICATION

This is a continuation of application Ser. No. 619,318, filed Oct. 3, 1975 and now abandoned.

BACKGROUND OF THE INVENTION

The present invention relates to a dispensing system and more particularly to a control and display system for fully automated self-service operation of a gasoline station.

With the ever increasing price of gasoline, the popularity of self-service stations which provide the consumer with the opportunity of supplying gasoline to his own vehicle at a savings without a reduction in profits to the station owner has greatly increased. Several self-service control systems have been developed permitting a single and relatively unskilled operator to monitor and control the dispensing of gasoline at a variety of pump locations.

To date, such efforts have produced hard wired complex digital systems which provide a plurality of digital displays of the volume and/or price information for each dispenser once the dispenser has been armed by the operator permitting its operation by the consumer. U.S. Pat. No. 3,878,377 issued Apr. 15, 1975 to P. Brunone is representative of such system. Also, self-service systems have been devised where the consumer can prepay for a predetermined amount of gasoline with the dispenser being automatically shut off once the dollar amount of the sale has been completed or the tank filled, whereupon the consumer receives change for whatever amount of the sale was not realized. U.S. Pat. No. 3,871,503 issued Mar. 18, 1975 to R. Greenwood is representative of such a system. Also, U.S. Pat. No. 3,765,567 issued Oct. 16, 1973 to J. Maiocco is representative of the general state of the art in gasoline dispensing systems.

The state of the art in the self-service gasoline dispensing area thus has been to utilize separate display units for each dispenser, each of which being located at a central area for the operator to monitor the sales and volume of each of the dispensers. Such systems utilize a tremendous number of digital logic circuits which typically include many integrated circuit chips mounted on printed circuit boards but which require costly circuitry for their interconnection. Inasmuch as they are hard wired, they lack flexibility for providing custom applications. Further, such systems have heretofore lacked capability of any significant expansion of functions.

SUMMARY OF THE INVENTION

It is the purpose and function of the system of the present invention to provide a less costly, more sophisticated control and display system for utilization in a self-service gasoline station and one which represents a quantum jump in the state of the art noted above. In order to achieve the objectives of the present invention, systems embodying the invention utilize an operator console including display means with the capability of simultaneously displaying at one location the status of a plurality of dispensers and desired sales information. The operator console also includes a data entry keyboard for selectively arming pumps for operation by a consumer and means for selecting information to be displayed by the display means during normal operation of the unit as well as in a mode of operation for inventory control typically utilized by the station manager at the end of the day or at the end of each operator shift. The system includes a central control having a central processing unit with memory means controlling data handling therefor and interface circuits for the data entry keyboard and display as well as interface means for coupling the central processing unit to each of a plurality of dispensers. The dispensers in turn include circuit means for generating signals representative of the volume of fluid dispensed therefrom as well as control means coupled to the central control unit and responsive to signals therefrom for actuating the dispenser and transferring data between the dispenser and the central control unit.

By utilization of relatively sophisticated central processing units having significant data handling capability and programmable memories, system flexibility and capability is provided which far surpasses the limitations of the prior art. With such a system, inventory control information can be momentarily recalled by the station manager and instantaneous sales information provided to the operator for any one of the dispensers. These and other advantages, objects and features of the present invention can best be understood by referring to the following description thereof together with the accompanying drawings in which:

BRIEF DESCRIPTION OF THE DRAWINGS

FIGS. 10A and 10B are flow diagrams of the operation of the first embodiment during a typical dispensing cycle of operation;

FIG. 11 is a flow diagram of the operation of the first embodiment shown during a typical off-line cycle of operation;

DETAILED DESCRIPTION OF THE PREFERRED EMBODIMENT

Figure 1:
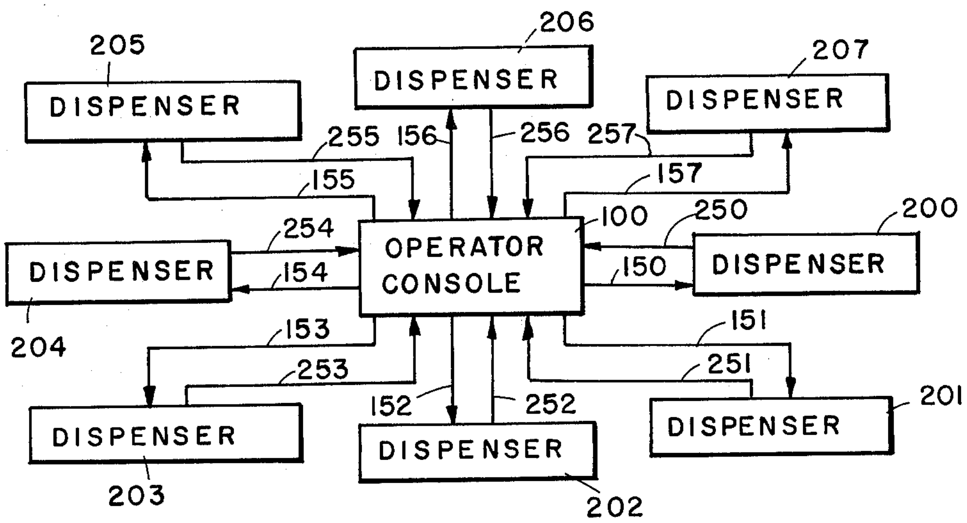
FIG. 1 is an electrical circuit diagram in block form of one embodiment of the present invention.
Figure 2:
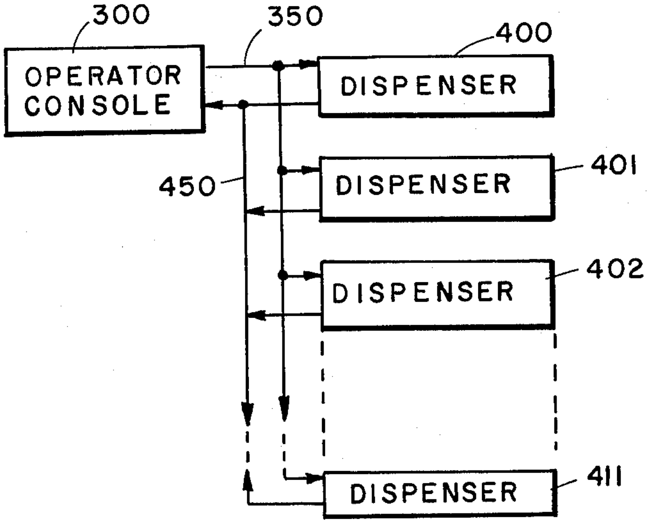
FIG. 2 is an electrical circuit diagram in block form of a second embodiment of the present invention.
Figure 3:
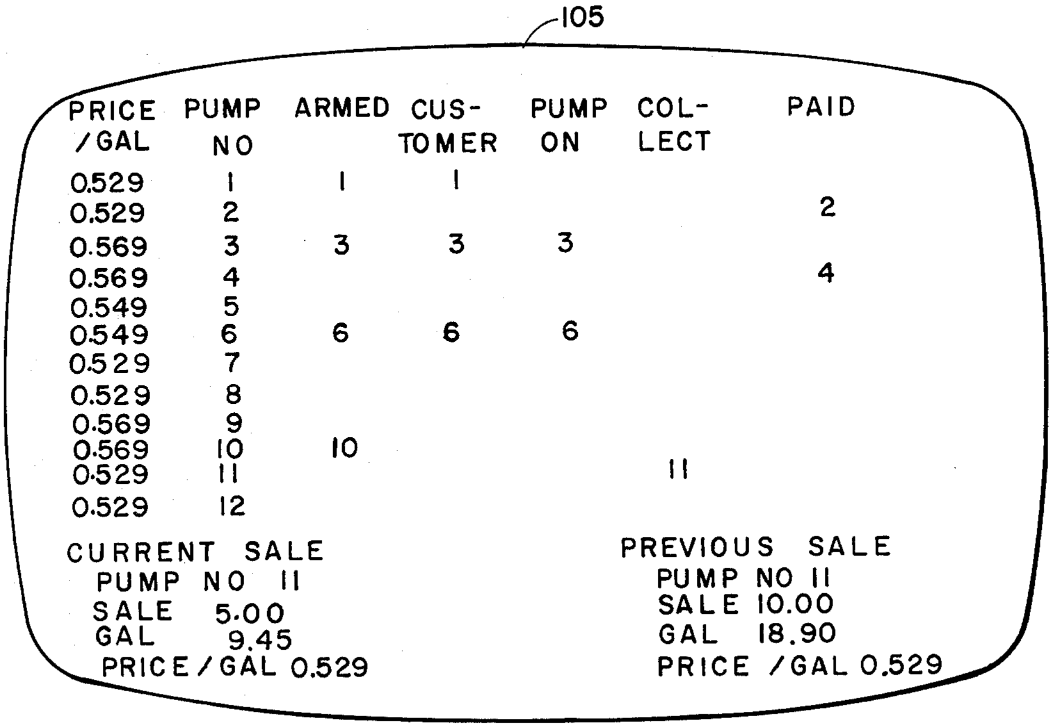
FIG. 3 is a schematic view of the operator display means utilized in the systems of the preferred embodiment.
Figure 4:
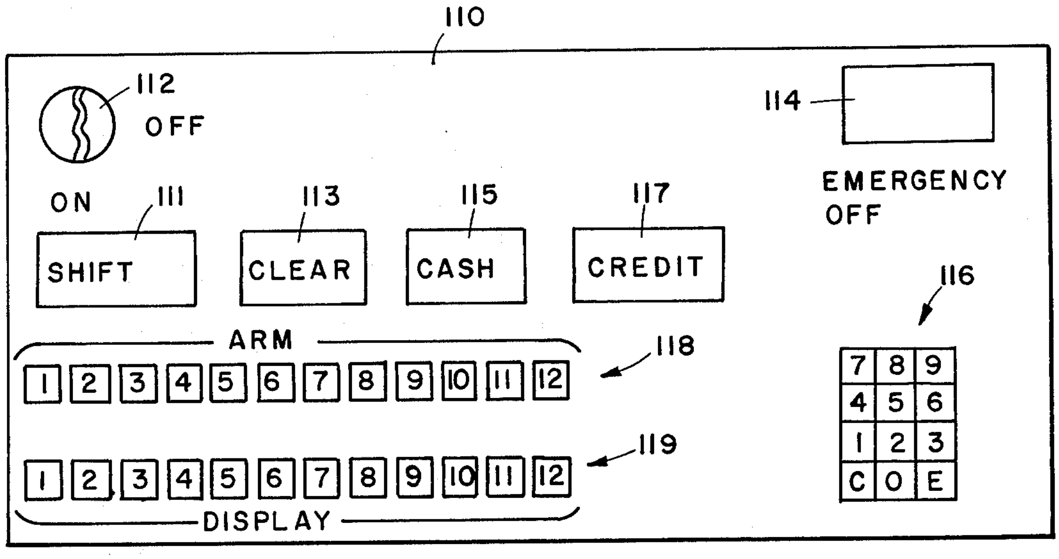
FIG. 4 is a schematic view of the data entry keyboard used in the preferred embodiments of the present invention.
Figure 5:
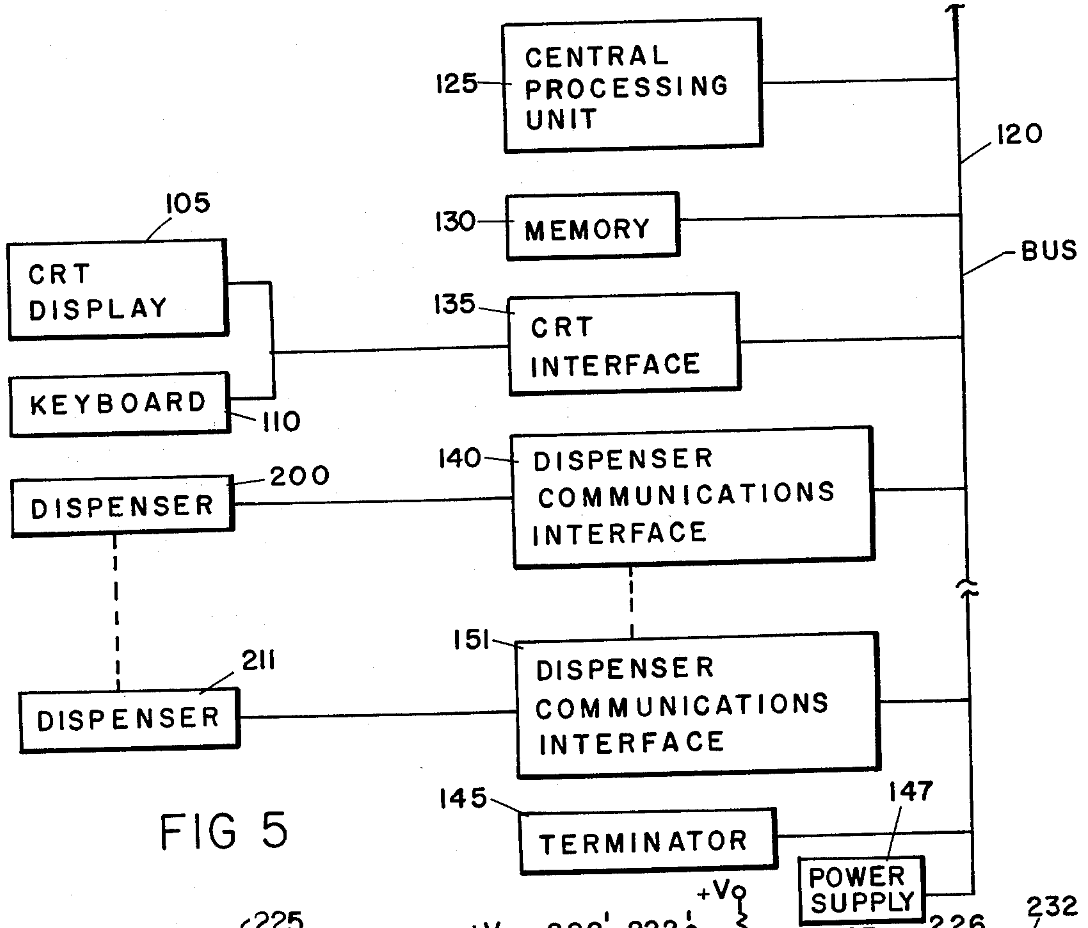
FIG. 5 is an electrical circuit diagram in block form of the operator console of the embodiment shown in FIG. 1.

Referring now to FIGS. 1 and 2, there are shown two systems constituting the preferred embodiments of this invention. In FIG. 1, the operator console 100 is coupled to a plurality of dispensers 200–207 with eight such dispensers being shown, it being understood that typically, a service station will include twelve or more dispensers. The operator console includes a CRT display 105 the face of which is shown in FIG. 3, a data entry keyboard 110 shown in FIG. 4, as well as the control and interface circuits shown in greater detail in FIGS. 5 and 6. These units, intercoupled as shown in FIG. 5, constitute the operator console 100 which is typically located in a central area and manned by a single operator who can control the dispenser operation as well as receive payment from the customer utilizing the self-service dispensers.

Each of the dispensers 200–207 includes a gasoline pump and valve means including a hose and nozzle usually remotely located from the operator console. In addition, each dispenser includes control and display circuits for generating digital data representing the volume of product dispensed as well as circuits responsive to signals from the operator console for arming the dispenser and for receiving and displaying current sale data to the customer. The operator console 100 is coupled to each of the dispensers 200–207 by two pairs of wires with transmitting lines 150–157 extending from the operator console to the dispensers 200 for transmitting control and data signals thereto and receiving lines 250–257 for the transmission of data from the dispensers to the operating console. In the system of FIG. 1, the operator console includes data processing circuits for making the desired calculations with the dispensers providing volume information to the operator console.

The system of FIG. 2 incorporates an operator console 300 coupled to each of a plurality of dispensers 400–411 in a parallel wire system as seen in FIG. 2 which simplifies the installation significantly. In this system, each of the dispensers includes digital data processing means for calculating and providing both total volume and price information as well as other data which is communicated between the dispensers and the operator console via the common pairs of wire data lines 350 and 450 thus utilizing a party line communication system intercoupling the operating console 300 with the dispensers each with their own data processing capabilities and which are thus referred to as "smart" terminals. Having briefly outlined the FIG. 1 and FIG. 2 embodiments of the invention, a detailed description of first the FIG. 1 embodiment is provided in conjunction with FIGS. 3–7.

Common to each of the systems shown in FIGS. 1 and 2 is the CRT display which is located at the operator building or facility and which includes a CRT having a preferred display area as shown in FIG. 3 for displaying status information for each dispenser. The price per gallon is displayed in the first column on the left of the display corresponding to each type of gasoline associated with each of the pumps identified in the second column as numbers 1–12. In the third column, status data is displayed as to whether or not the particular pump has been armed by the operator and thus permitting the customer to utilize the dispenser. In order to arm a particular dispenser, the operator actuates one of the correspondingly numbered push button switches 118 on the data entry keyboard as shown in FIG. 4. Thus, in the particular display shown, pumps 1, 3, 6 and 10 are currently armed and thus operable. The display utilizes the pump numerical identification in this and in each of the remaining display columns to facilitate operator reading of the display.

In column 4, information is displayed as to whether or not the customer has turned the dispenser on by actuating the on-off switch. The dispenser on-off switch is usually turned on by a rotary motion of a handle which covers the nozzle boot. The nozzle cannot be hung up if it is "on" and it cannot be turned on if the nozzle is stowed. If the dispenser is not armed, the customer indication is displayed to indicate a customer requires attention. In the display, it indicates that customers at pumps 1, 3 and 6 have turned on the dispensers but have not necessarily begun dispensing fuel.

The fifth column indicates that the nozzle has been actuated by the customer at pumps 3 and 6 and at least a minimum flow of a few thousandths of a gallon of fuel has begun. Before the customer actually begins dispensing gasoline, he may actuate the dispenser on-off switch thereby flashing the display in column 4 as many times as desired. Once, however, the customer has begun dispensing fuel, further actuation of the switch from the "on" position required for the dispensing of fluid to the "off" position will automatically display a collect indication in column number 5 and prevent further actuation of the dispenser until the amount for that sale has been paid and the pump then subsequently rearmed by the operator. This occurs also if the operator goes to the off-line mode temporarily and then back to on-line through actuation of switch 112. When back to on-line, the system displays "collect" for all dispensers.

In the particular display shown in FIG. 3, the customer at dispenser number 11 has completed his fuel delivery and turned off the dispenser by typically hanging up the nozzle, which automatically shuts off the on-off switch of the dispenser. This in turn indicates to the operator in column 6 that the customer has completed the pumping operation and payment for the sale should be made. The display format is easily changed by changing the program stored in ROM. Variations include, for example, continuously displaying the dollar and gallon readouts for all dispensers and their present status in words.

In the system of the preferred embodiment in conjunction with the data entry keyboard 110, the operator can select any one of the dispensers 1–12 for display by actuating one of the push buttons 119 shown in the FIG. 4 system. In the example shown, the operator has actuated button number 11 to display the current sale information for pump number 11 in the lower left-hand corner of the screen providing him with the information relevant to the sale so that he can collect for the sale. Once the customer has paid, either by cash or credit, the operator depresses switches 115 or 117, respectively, in the console data entry keyboard and the number 11 will be displayed in the seventh or "paid" column once the transaction has been completed. Pump number 11 may then again be rearmed for another dispensing cycle. In the particular example shown, in order to provide storage of the previous sale which may be necessary in cases of high volume stations to allow the pump to be armed prior to payment of initial sale, the initial sale data is also displayed as previous sale by the CRT in the lower right-hand corner. Once the operator has selected a particular dispenser for display, the display in the lower left corner of the screen continuously updates the data during the course of the dispensing operation. Although it is possible in the system of the preferred embodiment to provide a display of each of the pumps which is being actuated by a customer, it has been discovered that it is preferable to display only one pump at a time to the operator thus preventing a customer from viewing the display screen and indicating that he was at a dispenser with a lowered volume transaction. The operator can, however, monitor the course of a transaction any time by selecting the particular dispenser of interest and actuating one of the switches 119. The station attendant operates (depresses) "shift" and "E" switches 111 and 116, respectively, at the end of each shift. This stores station totals, gallonage, dollars and number of customers at the end of his shift for all completed sales.

The system has on- and off-line modes of operation controlled by a key actuated switch 112 which is shown in the "on" position in FIG. 4 for normal transactions during the course of daily business but which can be moved to the off-line position by the station manager permitting the manager to change the price of gasoline, call up the shift or daily totals on each type of product displaying the dollar and/or gallon totals of sales which can also be divided and displayed as cash and credit sales. During the off-line mode of operation, the FIG. 3 display is not utilized but a single or multiple line format employed for generating display information for the station manager in terms of instructional information as well as data display is used.

When the station manager switches from an on-line mode of operation, access to the memory of the system is achieved by means of a conventional digital keyboard 116. The manager can use the keyboard 116 to recall total information from memory by entering the number displayed on the CRT for that function. The functions include but are not limited to station totals (gallons, dollars, number of customers), shift totals (station totals at the end of each shift), cash totals (gallons, dollars, number of customers for cash sales), credit totals (gallons, dollars, number of customers for credit sales), inventory totals (remaining gallonage of each product, gallonage dispensed by each product, dollars collected for each product), price setting (the price is set for each product or for individual dispensers using the keyboard), zero totals (all totals, prices per gallon, internal values are set to zero), diagnostics (the dispensers all cycle through the numbers 0–9 and blank on their displays while at the same time writing a word or phrase at every CRT location. When "clear" is held, this function ceases and the CRT will echo every key switch that is depressed on the keyboard. This checks system function.), mode (allows manager to select manual, postpay, or prepay modes), and assign (allows manager to assign dispensers to products). Each total, except shift, may also be altered using the keyboard in this mode. When finished with any total or function, the manager depresses the "clear" switch to go back to the list of off-line functions.

During the off-line mode of operation, the dispensers will be inactivated so that the price of gasoline is not changed in the middle of the transaction. In the event of an emergency situation, the operator or the station manager can actuate switch 114 which automatically deactuates all of the dispensers. When deactuating all dispensers with emergency switch 114, the power to each is completely removed by de-energizing control relays. This switch is operative in the on-line mode. If manual operation is desired, the station manager can switch to the off-line mode of operation, actuating switch 112, enter an appropriate code in keyboard 116, and switch back to the on-line mode providing conventional manual operation of individual dispensers in which selected dispensers are continuously armed so that conventional attendant operation of the service station can be carried out. Further, a prepay mode of operation, selected in off-line position, is possible in which case the operator enters the sale either in gallons or dollars through the keyboard 116 when arming the pump. When the dispenser reaches the selected value less a small amount, the main dispenser valve is closed and only a smaller, low volume valve remains open until the exact amount is reached. Then it, too, is closed and the pumps are deactuated. Having described the functions of display and operation common to the two systems of the preferred embodiments, a detailed description of the structure of the FIG. 1 embodiment is now presented with reference to FIGS. 5–7.

The central control system shown in FIG. 5 comprises a plurality of printed circuit boards each including several integrated circuit modules mounted thereto and electrically intercoupled on the board, which boards are subsequently plugged into a common bus 120. The bus includes 36 lines (i.e., conductors) utilized for data, address and control signals between the various printed circuit boards coupled thereto, as well as 26 additional lines which include the power supply conductors and several spares permitting expansion of the system. The packaging system of the chassis including the bus line is a commercially available unit.

Coupled to the bus line is a central processing unit (CPU) 125 which is a self-contained 8-bit general purpose parallel processor including electrically interconnected six 8-bit registers, an 8-bit accumulator, an 8-bit parallel arithmetic unit, a 16-bit program counter, a 16-bit stack pointer and a 2 MHz clock. The unit of the preferred embodiment is a commercially available unit Model No. CM 4400 available from Process Computer Systems, Inc. Other central processing units, however, can be employed. Associated with the CPU 125 is a memory unit 130 also on a printed circuit card inserted into the bus 120 and comprising sixteen random access memories (RAMs) with 16-bit address decoding logic for providing up to 4096 BYTES of random access memory for use in storing variables such as pricing information, total sales information, inventory information and the like as well as providing an updated storage of ongoing transactions for each dispenser. In addition, the memory circuit 130 includes 32 read-only memory chips (ROMs) with 16-bit address decoding logic for providing control of data through the standard subroutines. Memory 130 includes, in addition to the ROMs, a plurality of programmable read-only memories (PROMs) which are provided and are programmed together with the ROMs in accordance with the flow diagrams of FIGS. 10 and 11 to provide the various controlling functions for the CPU. The PROM lends programming flexibility to the system such that functions can be added or changed as desired. If large scale production of a finalized system is intended, the program memory can be permanent in the form of custom ROMs.

The memory circuit 130 can consist of a pair of commercially available circuit board modules Models Nos. CM 4501 and CM 4503 also available from PCS, Inc. Other equivalent commercially available RAM, ROM and PROM cards together with their address decoding logic likewise could be employed to provide the data storage and instructional information for the CPU 125. Memory 130 thus operates in conjunction with CPU 125 to process data from the data entry keyboard 110 through a CRT interface circuit 135 and supply data through circuit 135 to the CRT display 105 as well as between the operator console and each of the dispensers.

Circuit 135 comprises a 16-bit digital input/output module for providing a two-way interface between peripheral devices such as the display and keyboard 105 and 110, respectively, and the central processing unit 125. Data is formatted as 6-bit modified ASCII and is transferred through the interface. Circuit 135 includes circuit means for receiving a flag signal from the peripheral device for gating data into the central processing unit as well as generating an interrupt signal for conditioning the CPU to receive the data therefrom. In the preferred embodiment, a commercially available module PM 5001, available from PCS, Inc., was employed. Other equivalent commercially available modules also can be utilized.

Display 105 conventionally includes in addition to the CRT, sweep generators, a power supply, a character generator and shift register memory means to provide the data display as represented in FIG. 3. Likewise, keyboard 110 includes an encoder for generating the 6-bit modified ASCII format data.

Also coupled to bus 120 is a plurality of dispenser communication interface modules 140–151 associated with each of dispensers 200–211 of the system. The dispenser communication interface modules basically consist of a commercially available universal asynchronous receiver-transmitter (UART) integrated circuit for receiving series data and outputing parallel data. Data on the bus line 120 is in parallel form while the data transferred between each dispenser and the operator console is in serial format. In the preferred embodiment, a commercially available module PM 5082, available from PCS, Inc., was employed for each of the interface circuits 140–151 in the twelve pump installation. Commercially available equivalent circuits can also be employed. Bus line 120 is terminated by an impedance terminating circuit 145 consisting of passive resistance elements to provide a 315 ohm termination for each of the data lines of the bus. Terminator circuit 145 can be a commercially available unit Model No. PM 5000 manufactured by PCS, Inc. or its equivalent.

In addition to the data processing, memory and interface circuits identified above, coupled to bus 120 is a power supply module 147 which supplies the positive and negative regulated DC voltage for operation of the system. Several commercially available power supplies can be employed and in the preferred embodiment, Model No. PS 3021, commercially available from PCS, Inc., was used.

Figure 6:
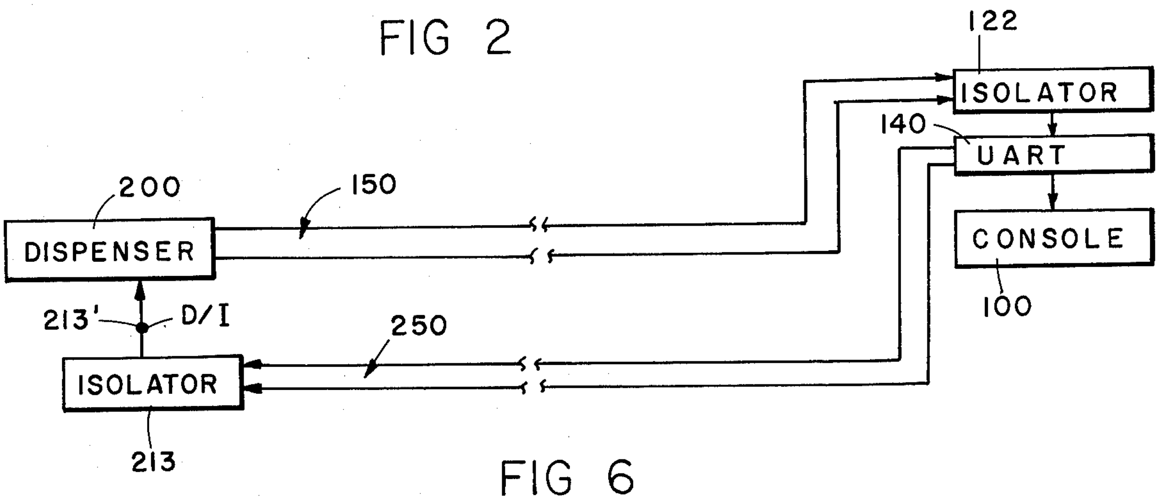
FIG. 6 is an electrical circuit diagram in block form of the interface circuits between the operator console and each of the dispensers associated therewith.

In order to minimize objectionable induced noise voltage between each of the dispensers and the operator console, the interface circuitry shown in FIG. 6 is utilized. Pairs of electrical-optical isolator circuits 122, 213 are used between each pair of transmitting and receiving pairs of conductors coupling each dispenser to the operator console. Such an arrangement not only provides noise immunity but provides ground loop current isolation. In FIG. 6, it is seen that the twisted pair of transmission lines 150 from the dispenser to the operator console 100 associated with dispenser 200 are terminated at the console end by an optical isolator 122 in turn coupled to the interface circuit 140 which includes the UART as noted above. The optical isolator circuit 122 comprises a commercially available LED-phototransistor combination consisting of a LED actuated by signals on twisted pair 150 to modulate its light output according to data received and in turn actuating the proximately mounted phototransistor for providing an electrical output signal to the UART.

Thus, it is seen that the isolator 122 electrically isolates the input terminals from its output terminals coupled to the UART interface 140 by virtue of the optical coupling between the LED and the associated phototransistor. Similarly, in the receiving pair 250 associated with dispenser 200, an identical electricaloptical isolator circuit 213 is employed at the dispenser end and has an output terminal 213' coupled to the input circuit of dispenser 200. Similarly, each of the dispensers 201–211 in the embodiment shown in FIG. 1 includes an associated isolator circuit 213 at the dispenser end and the operator console includes a similar isolator circuit 122 for isolating the electrical current loop between each dispenser and the operator console.

Each of the dispensers 200–211 is of identical construction and mechanically comprises a conventional commercially available gasoline pump, hose, valve and nozzle arrangement which are in common usage. Electrically, however, the systems are unique and each includes the circuitry shown in FIG. 7 now described.

Figure 7:
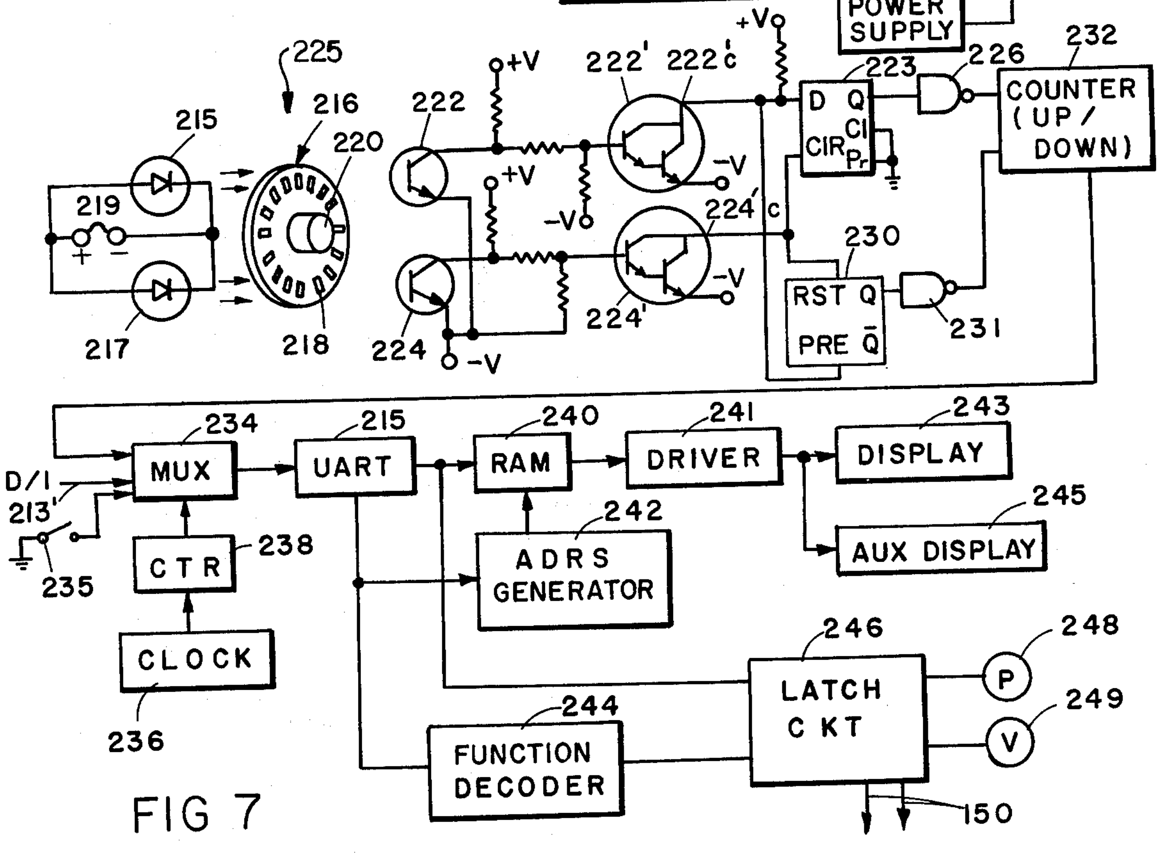
FIG. 7 is an electrical circuit diagram, partly in schematic and partly in block form, of the electrical circuits of each of the dispensing units shown in FIG. 1.

In the embodiment shown in FIG. 1 and FIG. 7 as noted above, the dispenser itself generates only pulses representative of the volume of fuel pumped. Accordingly, a volume representative pulse generating circuit 225 is provided and includes a light chopping disc 216 having a plurality of notches 218 and coupled to and rotated by the fuel pump by means of shaft 220. Disc 216 rotates at a speed directly related to the volume of fluid passed by the pump during its operation. A pair of light emitting diodes 215 and 217 are positioned on one side of disc 216 and are actuated by a power supply through terminals 219 to provide pulses of light passing through slots 218, the number of which represents the volume of fuel from the dispenser. Diodes 215 and 217 are positioned with respect to the chopper disc 216 and a pair of detecting phototransistors 222 and 224 on the opposite side of the disc such that the signal outputs at the emitter terminals of the phototransistors are in quadrature (i.e., displaced by 90°). Conventional power supplying and bias means for the phototransistors are shown in FIG. 7.

This unique arrangement prevents the possible occurrence of jitter interference by the disc 216 in the event it stops with the edge of a slot 220 in alignment with a light beam thus intermittently providing pulses to the associated photodetecting device representative of flow of fuel from the dispenser when in fact the dispenser is not operating. In addition, the quadrature detection arrangement permits the directional detection of the disc 216. In the event fuel is forced into the dispenser from a hose which has ballooned due to a nozzle shutoff or is run over by a vehicle, the disc 220, if stationary, will reverse to decrement the volume of flow of data supplied to the operating console and, therefore, be an accurate representation of the actual volume of product delivered. In order to provide the quadrature detection of pulses passed by chopper 216 which are then processed to provide volume information, the circuit now described is employed.

A pair of Darlington amplifiers 222' and 224' are coupled to the output of the phototransistors 222 and 224 respectively. The collector terminals 222'c and 224'c of amplifiers 222' and 224', respectively, are coupled to the D and clock inputs, respectively, of a D-type flip-flop 223 having its Q output coupled to the input terminal of an inverter 226. The collector of transistor 222' is also coupled to an R-S flip-flop 230 at the set input. The collector of transistor 224' is also coupled to the R-S flip-flop 230 at the reset input. The output of the R-S flip-flop 230 is coupled to the input of an inverter 231. The output of inverter 226 is coupled to the up-down counter 232, up-down control input. The output of inverter 231 is coupled to the count input of up-down counter 232.

Normally, when the dispenser is operated to dispense fluid, pulses from transistor 222 will lead pulses from transistor 224 thereby allowing the pulses from transistor 224 to set D flip-flop 223 to the high output position. In the event, however, that the output pulse from transistor 224 is first received, it will set D flip-flop 223 to the low output position. The output of D flip-flop 223 is inverted by inverter 226 and sets counter 232 to count up when it is low and down when it is high. The R-S flip-flop 230 will be set by the lead pulse and reset by the lag pulse. If the pulser should stop on an edge causing jitter, changes in either the lead or lag pulse can set and reset this flip-flop only once without having the other pulse appear.

Counter 232 thus provides an accumulated count representative of the volume of fluid dispensed from the dispenser during a dispensing operation. The output of the counter comprises 4-bit data which is applied to one input of a multiplexer circuit 234 which also receives data from a pump on-off signal from switch 235 operated by the consumer at the dispenser who actuates the dispenser on-off switch when dispensing fuel from the unit.

The multiplexer 234 applies data from the two inputs to a UART 215 when required by the function decoder 244. The function decoder circuit 244 receives information from the UART and selects either the up-down counter 232 or handle 235 if the command is an input, or selects the latch circuit 246 or the address generator circuit 242 if the command is an output. The UART 215 in turn provides parallel data output on four lines to a RAM 240 to write the data into the RAM. The address generator 242 also provides addresses to sequentially read the data out to the displays where data is not being written into RAM 240. The clock 236 provides the necessary frequency to sequence the address generator 242 and run the UART 215 through counter 238 and multiplexer 234.

UARTs 140 and 215 are commercially available circuits. The function decoder circuit 244 includes a plurality of digital comparators coupled to UART 215 to decode the first 8-bit word (i.e., command) outputed from the UART to ascertain if the incoming signal relates to an input or output function. If the word is an input command, the comparator is actuated to toggle the multiplexer 234 to apply one of the two multiplexer inputs to the UART for transmission to the console depending upon the command word received. If the command is an output command (i.e., a command to provide a control function at the dispenser), the function decoder comparator means detects the command word for an output and either actuates the address generator 242 to read the second word of the two word output from the UART 215, which is a data word into the RAM for display, or toggles the latch circuit 246 which in conjunction with the second word transmitted by the UART 215, actuates the pumps or valves associated with the dispenser. Thus, the function decoder in effect decodes the first word to properly route the second or data word from the UART 215 which actuates the circuit elements of the dispenser circuit. The remaining circuit elements of the dispenser circuit shown in FIG. 7 are conventional commercially available units.

Figure 10A:
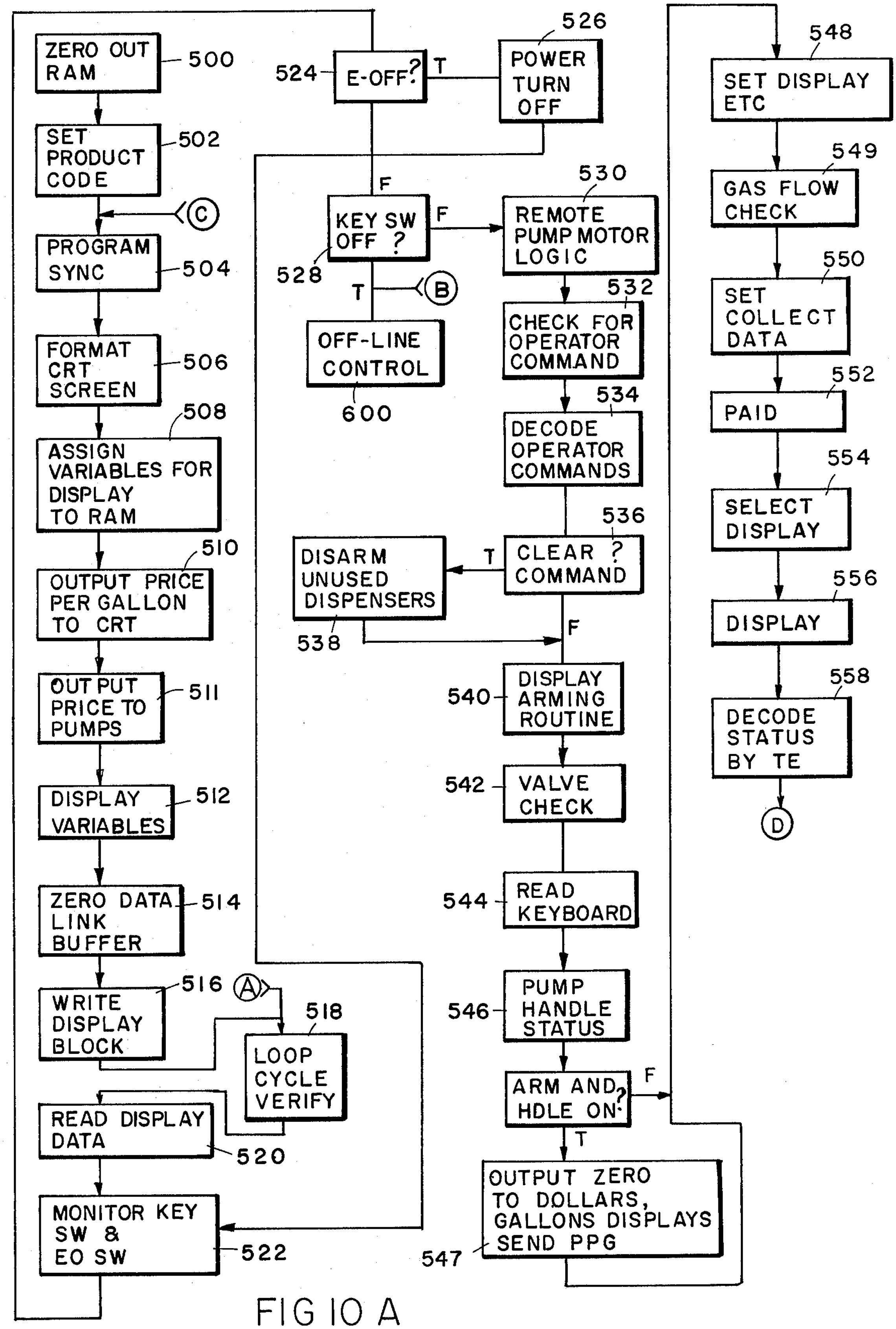

The RAM 240 outputs display data to driver 241 which drives both a main display circuit 243 and an auxiliary display circuit 245 located on opposite faces of the dispenser for providing updated volume and cost displays to the consumer. Having described the circuit elements constituting the operator console dispenser and their interface for the embodiment shown in FIG. 1, a description of a cycle of operation of the system is presented in conjunction with the flow diagram of the processing control provided by memory 130 of FIGS. 10A–10B and 11. FIG. 10 is divided into portions 10A and 10B interconnected as shown and referred to collectively as FIG. 10.

When power is first applied to the system, the variables in the RAM memory are first cleared from memory 130 (FIG. 5) as indicated by step 500 of the flow diagram of FIG. 10. Next, the product code identifying which of, for example, the products A, B and C is to be dispensed by each of the dispensers is set into the RAM by the processor. Once this is accomplished, the synthetic clock for the system initializes all loop counters, sets the base address of data blocks, initializes data blocks, and initializes data block pointers for all of the dispensers. This step is indicated by block 504 identified as the program synchronization step. Next, the display format is written from the ROM onto the CRT display. This fixed data includes the column headings shown in FIG. 3 with respect to the on-line operation.

The next step in the operational sequence indicated as assign variables for display to RAM at step 508 moves the storage index pointers from the ROM to an assigned RAM location via the processor. These pointers point to the storage area in RAM where the normally displayed variables such as the price per gallon and pump number indicated in the first two columns of FIG. 3. The variables then are outputed to the CRT buffer as indicated by step 510 where they will be used to update the CRT display as the CRT updates its screen from this buffer. Next, in step 511, the price per volume is sent to each dispenser.

Next, in step 512 the remaining display variables in RAM are applied to the CRT buffer. The data link buffer circuits in the CPU are then zeroed as indicated by step 514. This includes the zeroing of all data in the communications area for addresses, instructions and so forth. After this step, the block of display data at the lower left corner of the CRT screen (FIG. 3) is written into the CRT buffer to be displayed on the display screen as indicated by step 516. At this time a loop cycle verification step is performed, as indicated at block 518, which provides a check that the assigned pump does not exceed the number of pumps on the system. The CPU then checks each dispenser for a status BYTE including pump on-off handle, valve and pump status and volume pulses as indicated by block 520. If there is no response from a dispenser, it sets a failure flag and at the end of the subroutine, displays the failed pump on the CRT by setting the message into the CRT display buffer for updating the display on the CRT cursor travel.

Next, the status of the emergency off switch 114 (FIG. 4) is monitored, as indicated by blocks 522 and 524 in the flow diagram, and if the emergency off switch is in the "off" position, the status of the pump includes PPG, total volume and dollars and valves of each dispenser is stored in RAM by the CPU and the operating power to each of the dispensers and pumps is turned off and the light behind the emergency off switch is turned off by the CPU as indicated by functional block 526. The status of the emergency off switch is repeatedly checked until the switch is opened at which time the system then checks the status of the key switch 112 (FIG. 4) and turns on the emergency off switch light as indicated by block 528. If the key switch is in the "off" position, the system goes to the off-line mode 600 described in detail below in conjunction with FIG. 11. If the key switch is in the on-line position, the remote product pumps are actuated if the product is demanded due to dispensers using a particular pump's product being in use as indicated by block 530 of FIG. 10. Next, a check is made for an operator command from the keyboard 110 and if none is present, all unused dispensers are disarmed and any displays associated therewith are erased from the CRT screen by blanking their locations in the CRT buffer. This function is indicated by block 532 of FIG. 10.

Next, as indicated by block 534, any operator commands which are present are decoded and if a "clear" command has been generated by the operator by actuating a "clear" switch 113 (FIG. 4), as indicated by blocks 536 and 538, the unused dispensers are disarmed. If no "clear" command has been detected, the dispenser arming function shown by block 540 is next performed. In this routine, signals from the arming switches 118 of the data entry keyboard 110 are scanned and stored in the dispenser data block by the CPU. Next, the status of the dispenser valves is checked by the CPU as indicated by block 542. The keyboard data is then read into RAM as indicated by block 544. The pump handle status is then checked and entered into the RAM memory as indicated by block 546. In block 547, a check is made to see if the dispenser has been armed and that the pump handle is on. If so, the dollars and gallon displayed are sent zeros by the CPU, and the CPU extracts the PPG assigned to the dispenser from the RAM memory and sends that to the dispenser. The dispenser valve and flow pulses indicating that a consumer is utilizing the dispenser are then checked and its status set in RAM as indicated by blocks 548 and 549. Once gas flow is detected and the handle subsequently deactivated by the consumer, a status bit is set in the RAM by the CPU for generating the "collect" display as indicated by block 550 of FIG. 10. This provides the console operator with a display indication that the dispensing operation is terminated and collection should be made.

Subsequently, once the customer has paid and either the cash or credit switch (115, 117, FIG. 4) is actuated by the operator, the "paid" status bit is entered into RAM as indicated by block 552 in FIG. 10. Before a bit is entered into memory, the display for that dispenser must have been actuated by the operator by actuating the switch 119 (FIG. 4) for the dispenser involved. Actuation of this switch displays to the operator, as indicated by the block 554, the sales information necessary to collect payment from the customer before the system will enter a "paid" indication on the CRT display. This assures the operator that the correct amounts are collected for each of the dispenser operations. Once the particular dispenser is selected for display, the display block 556 decodes the pump status word and converts it to a format necessary for display by the CRT as indicated by block 556. This data is then decoded, as indicated by block 558, to ascertain which of the dispensers' data is to be displayed and causes the display of the data related to the selected dispenser.

Next, the shift switch 111 (FIG. 4) is checked to see if it has been actuated as indicated by block 560. If it has been, the station totals for the shift are recalled from RAM by the CPU, as indicated by block 562, and the station total data is stored at the first shift location after moving all shift locations to the next highest shift storage locations in RAM. Typically, the previous data stored in the third shift location is lost. After determining shift switch status, all variables on the CRT screen are updated as indicated by block 564.

Next, a dispenser pump is checked (block 566) and if it is active, a subroutine 575 is provided for controlling the display of data at the pump as well as receiving the volume and dollar data from the pump. This subroutine includes separate functions 568–582 now described.

In subroutine 575, first the dispenser data is transferred into the active area of the CPU, as indicated by block 568, for calculations such as the volume increment information multiplied by the price per gallon stored in RAM are performed as indicated by block 570. Next, the output communications buffer data is zeroed with the address remaining intact, as indicated by block 572, followed by the loading of the output buffer with the output data calculation from the preceding step as indicated by block 574. The leading zeros are then blanked which controls the displays for the dispenser involved such that only those digits actuated to display data are lighted with the remaining digits being blanked as indicated by block 576. This function is also provided for the price per gallon display as indicated by block 578. Next, the computed data is loaded into the output buffer and transmitted through one of the UARTs 140 to the associated dispenser as indicated by the functional block 580. The same updated data is then moved to the work area of the dispenser data block in the CPU as indicated by the functional block 582. Then the status of cash or credit switches 115 and 117 is made as indicated by decisional block 590.

If the decisional block 566 indicates that the dispenser is not armed, however, subroutine 575 is bypassed and the CRT display is updated with additional characters as indicated by block 584. Once the decisional block 590 is reached, if a cash transaction is indicated, the system updates (block 592) all station totals in RAM to conform to the data of the new transaction after which the system checks the emergency on-off switch and the key switch status by recycling to the interconnection Ⓐ in FIG. 10 for the next dispenser in the multiple dispenser system.

Thus, the steps 520–592 are repeated for each dispenser which assures that the system continuously checks and updates the status of the data from each of the dispensers as well as the commands generated by the data entry keyboard and updates the dispenser the operator console displays to maintain current information for the operator and customer during the normal operation of the system in the on-line mode. In the event the key switch 112 is actuated to off-line mode, the following sequence of steps occurs providing the desired operation. For off-line mode of operation, the entry point to the flow diagram is from point Ⓑ of the FIG. 10 diagram where subroutine 600 is used. First, as indicated by block 601, the on-line screen format is erased from the operator's CRT and the off-line format is displayed on the CRT. This format includes the following lists of possible functions with the associated identifying data entry key from the digital keyboard 116 permitting the operator to provide the indicated functions.

0. station totals
1. shift totals
2. cash totals
3. credit totals
4. inventory totals
5. set price/gal.
6. zero all totals
7. diagnostics Once this format is printed, the status of the key switch 112 is verified as indicated by decisional block 602 and if the switch has been turned to the on-line mode, the process is transferred to point Ⓒ of the flow loop as indicated in FIG. 10, block 500. If the key switch remains in its "off" position, all of the dispensers are turned off to remove power during the off-line mode of operation as indicated by block 604. Next, the product code identifying the type of product (A, B or C) assigned to each dispenser is set as indicated by block 606 followed by the zeroing of all data in the communications area for the data link of the CPU as indicated by block 608.

Next, the keyboard switches 116 (FIG. 4) are read to determine whether or not the operator has selected one of the possible subroutines as indicated above for display as indicated by block 610. Any signals generated by the operator in actuating the keyboard are decoded, as indicated by block 612, to determine whether or not any subroutines have been selected as indicated by decisional block 614. If the operator has not yet called for a subroutine, the process returns to the input of block 600 and cycles through the loop until the operator actuates one of the digital keys 116 selecting a subroutine at which time one of the subroutines 616 is selected and a format for that subroutine is displayed to the operator on the CRT through the circuits employed also in the block 601 function. Depending upon the subroutine selected, the operator either can recall inventory data, program the price per gallon or provide the other functions desired utilizing the information stored in RAM as well as the control sequences in ROM. The system then sequences through the functions indicated by blocks 618–624 and recycles.

It is noted that the control of the system can be modified as desired to provide the functions indicated and the flow diagrams shown in FIGS. 10 and 11 are merely representative of the control of the system of the preferred embodiment of FIG. 1. Having described this embodiment, a description of first the circuitry and then the functional control of the circuitry of the FIG. 2 embodiment follows.

Figure 8:
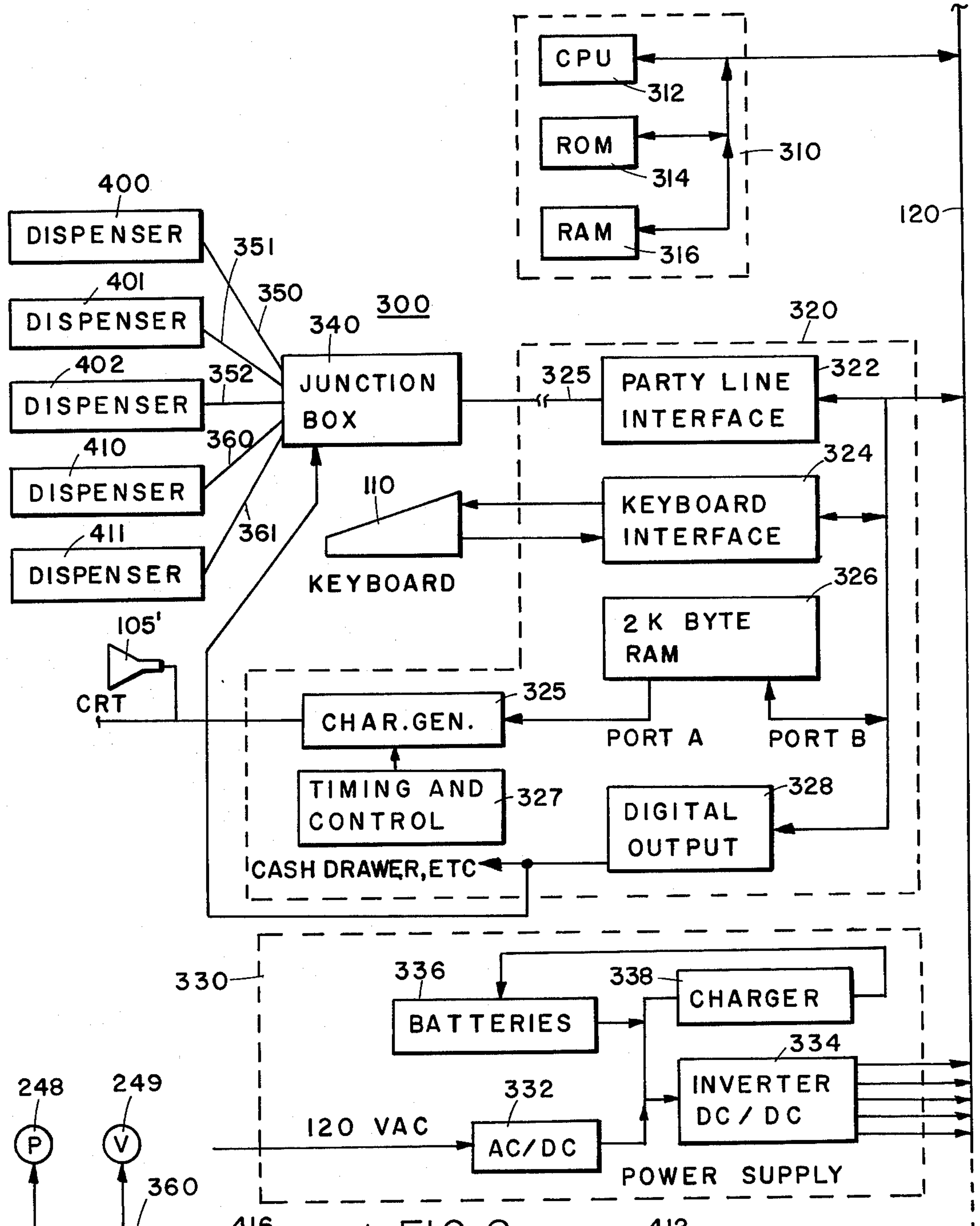
FIG. 8 is an electrical circuit diagram in block form of the operator console of the embodiment shown in FIG. 2.
Figure 9:
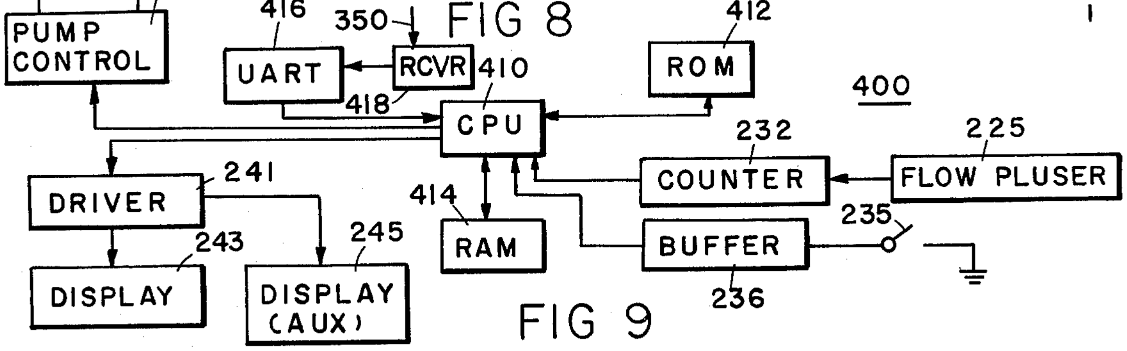
FIG. 9 is an electrical circuit diagram in block form of one of the dispenser circuits used in the FIG. 2 embodiment.

The second embodiment of the invention, shown in FIG. 2, is shown in greater detail in FIGS. 8 and 9. In this embodiment, each of the dispensers includes a central processing unit permitting each of the dispensers to calculate display information for the dispenser and permitting communications between the operator console and each of the dispensers utilizing only a four wire data link between the remote operator station and a junction box located in the vicinity of the dispensers. The system as shown in FIG. 8 incorporates a first central processing unit module 310, an interface module 320 and a power supply module 330, all coupled to a bus 120 which is substantially identical to that of the FIG. 1 embodiment previously described.

The central processing unit module 310 includes a central processing unit 312 consisting of an Intel 8080 circuit, a ROM 314 having 8192 BYTE storage capability, and a RAM 316 with 1024 BYTE storage capability. The ROM 314 is programmed as described in detail below with reference to FIG. 12 to perform basic functions substantially identical to those previously described with respect to the FIG. 1 embodiment with the exception that the total volume and price information for each dispenser is calculated at the dispenser itself and only update information is transmitted to the operator console 300 from each of the dispensers. Thus, the storage capabilities of the RAM 316 can be considerably reduced over that of the first embodiment and the data rates can be considerably reduced. Also, the results of noise on the intercommunications wire will be minimized as only results are transferred.

The interface circuit 320 includes a party line interface 322 comprising a UART for converting parallel data on bus 120 to serial data supplied to each of the dispensers through a four wire data link 325 coupling the UART 322 to the junction box 340 and subsequently to each of the four wire data links 350–361 of the twelve dispensers 400–411 respectively. Since relatively low impedance interface circuits are employed by both the dispensers and the interface, the optical isolaters used in the FIG. 1 embodiment and shown in FIG. 6 are not necessary in this embodiment.

The interface module 320 includes a keyboard interface 324 consisting of a circuit which can be identical to the interface circuit 135 described above with reference to FIG. 5. Coupled to the keyboard interface 324 is a data entry keyboard 110 also identical to that previously disclosed with the exception that instead of using modified 6-bit ASCII, 42 digit matrix digital format is used.

Interface circuit 320 further includes temporary storage for data to be displayed to the operator. For this purpose, a 2048 BYTE RAM 326 is coupled to the CPU through bus 120 and to a character generator 325 associated with the CRT display 105'. A timing and control circuit 327 is also provided for synchronizing the character displayed with the data applied to the character generator from the storage circuit 326. Finally, the flexibility of the system is increased by the use of a digital output circuit 328 coupled to bus 120 for providing additional control functions such as signal means for controlling the opening of the cash drawer once a sale has been completed and the cash switch of the keyboard actuated, energizing the proper pump control relay at the junction box, and other outputs which can be utilized to actuate, for example, a ticket printer or other recording means for data of the system. Digital output circuit 328 can be identical to circuit 324.

A power supply module 330 is adapted to be operated on 120V AC through a rectifying filtering and regulating circuit 332. The output of circuit 332 is applied to a DC-to-DC inverter 334 to provide the positive and negative regulated voltages to the various circuits of the system through bus 120. In addition, the output from power supply 332 supplies power to a battery charger 338 for continuously charging backup batteries 336 capable of operating the system for a period of about 15 minutes for backup power in the event that a power failure is incurred. If all power is lost and fuel can no longer be dispensed from the dispensers by virtue of the loss of power to the pumps, the power supply with the backup battery source will still enable the operator to consumate all sales in progress at the time of the power outage.

Each of the dispensing units 400–411 is identical in the embodiment of FIG. 2 so that a description will be provided of only one of the identical units. In this system, the use of a function decoder and its associated address generator is not required inasmuch as a CPU and memory circuits are employed thus greatly simplifying the system and eliminating several of the circuits required in the dispensers shown in FIG. 7. In the dispenser circuit shown in FIG. 9, a Fairchild Type F8 3850 CPU is employed with a mating 3851 read-only memory 412 for providing the control of data processing of the CPU 410 and an integral RAM 414, identical to RAM 314, is employed for providing temporary storage of the data for each of the dispensers. A flow pulser 225, identical to that of the FIG. 1 embodiment, provides pulses supplying the fuel volume and direction information to the CPU 410 through counter 232. In addition, customer actuated dispenser switch 235 is coupled to the CPU 410 through a buffer circuit 236. A UART 416 receives control signals consisting of serial data through a driver receiver 418 coupled to the four wire data link 350 and converts the control data into parallel output data applied to the CPU 410. The CPU 410 processes the incoming data and provides output signals to a pump control circuit 360 which is employed to actuate the dispenser pump or valve 248 and auxiliary valve 249 once the dispenser is armed and the customer is ready to begin dispensing fuel. As fuel is dispensed, the accumulated price and volume information is calculated by the CPU and outputed to a driver circuit 241 for actuating a main display 243 and an auxiliary display 245 located on opposite sides of the dispenser. This data is also applied to the updated sales information for the operator on demand. Displays 243 and 245 are identical to the displays utilized in the FIG. 1 embodiment and can be conventional digital displays providing the customer with continuously updated volume, price, and price per unit of volume information during the transaction.

Figure 12A:
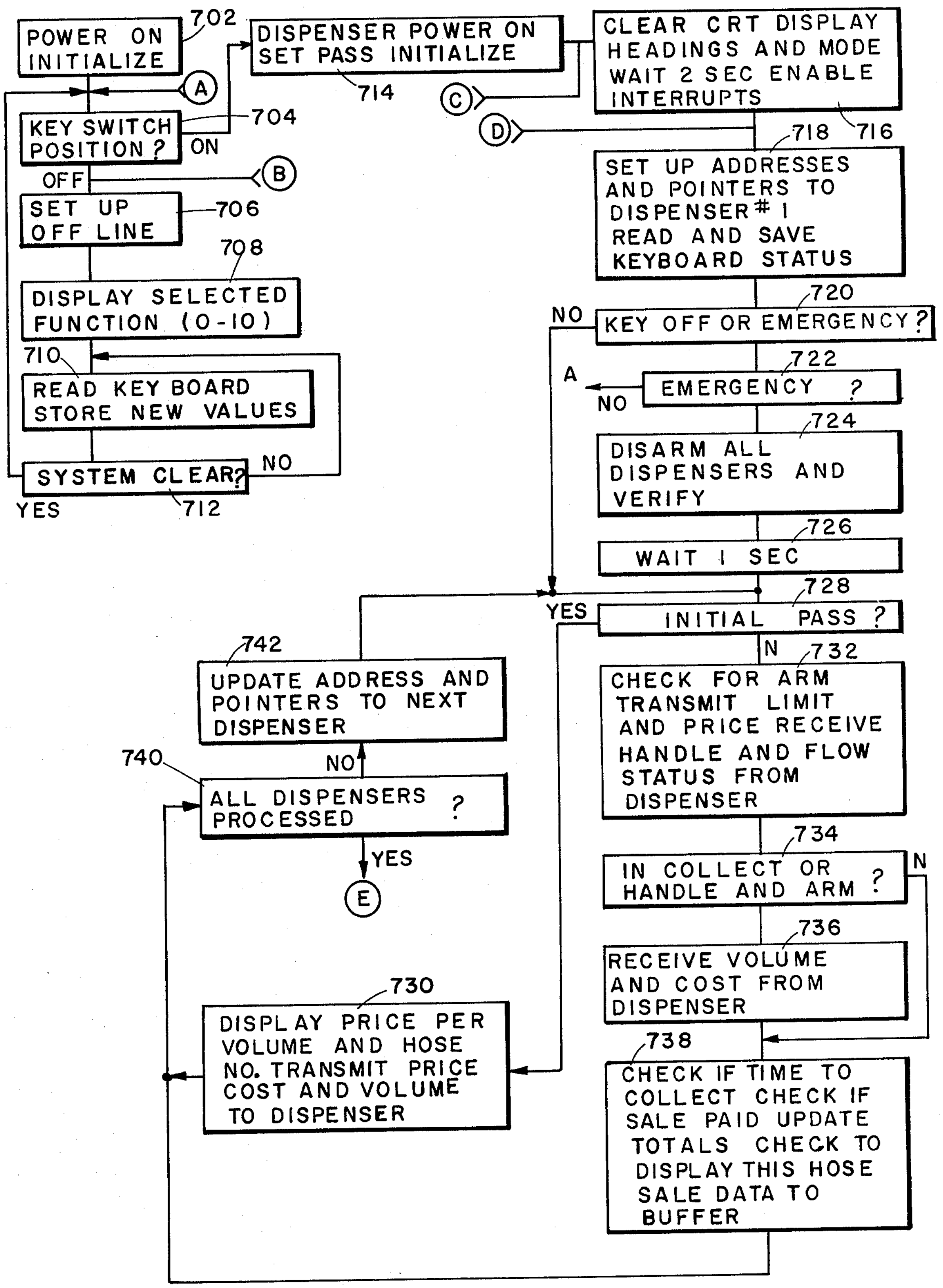
FIGS. 12A and 12B are flow diagrams of the operation of the operator console of the second embodiment during a typical dispensing cycle of operation.
Figure 12B:
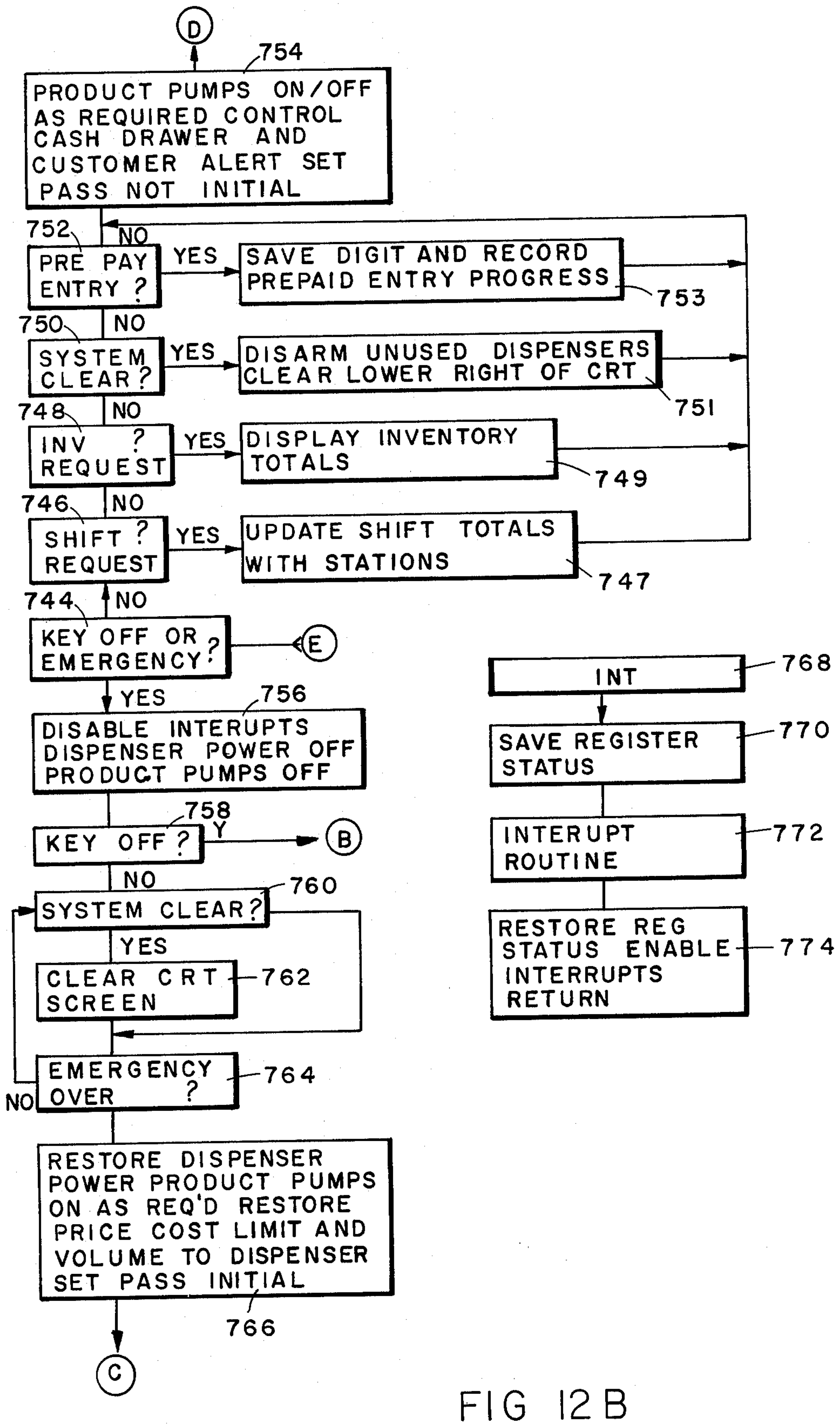
Figure 13:
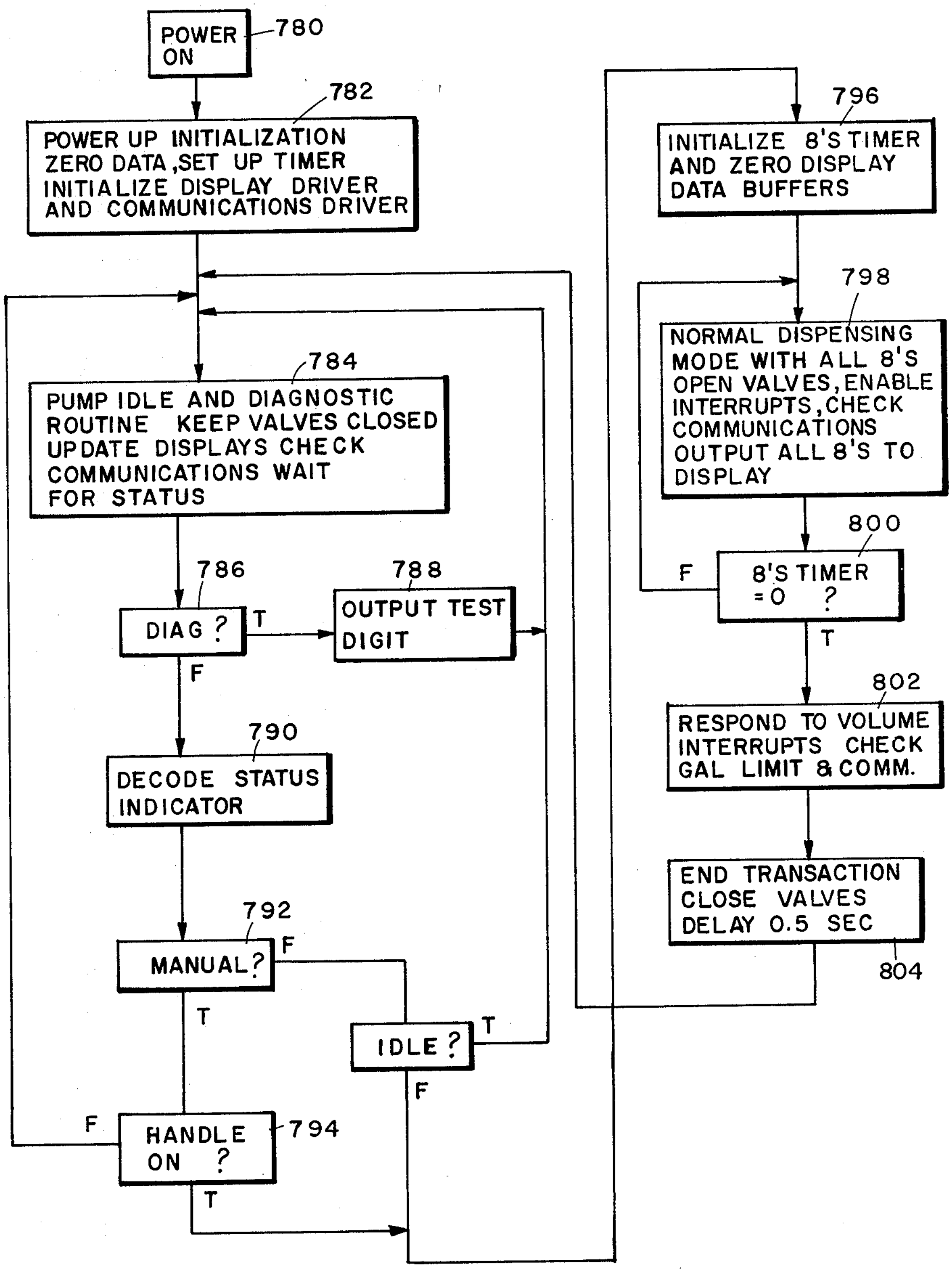
FIG. 13 is a flow diagram of the operation of one of the dispensers of the second embodiment shown during a typical cycle of operation.

A brief description of a cycle of operation of the FIG. 2 embodiment is now presented in conjunction with FIGS. 12 and 13, beginning with a description of the operation of the central control. FIGS. 12A and 12B are referred to collectively as FIG. 12 with the interconnections shown.

On power-up, as indicated by block 702 in FIG. 12, the CPU 312 (FIG. 8) disables its interrupts from the CRT 105' (cursor location), zeros out the RAM 316 CRT character storage locations, and initializes all RAM memory data block pointers. Next, the keyboard key switch 112 (FIG. 4) is read (block 704) and if in the "on" position, performs the functions indicated by block 714 as described below. If the keyboard switch is "off", the CPU clears the CRT RAM buffer of data and writes a list of function choices (block 706). Then the CPU loops awaiting a selection entered into the keyboard by the operator of a desired off-line function. The available functions of the preferred embodiment are as follows.

| Entry Key | Function |
|---|---|
| 0 | station totals |
| 1 | shift totals |
| 2 | cash totals |
| 3 | credit totals |
| 4 | inventory totals |
| 5 | set price/gal. |
| 6 | zero all totals |
| 7 | diagnostics |
| 8 | set operating mode (prepay, postpay, manual) |
| 9 | set allocation limit |
| 10 | station setup (assigning dispensers to product, etc.) |

The CPU then displays the function selected by the operator by writing its values into the CRT buffer RAM area (block 708).

Next, the CPU reads the keyboard data selected and stores it in the appropriate RAM data area and updates the display accordingly as indicated by block 710. Then the CPU tests the keyboard input (block 712) to determine if the "clear" key was depressed. If not, it repeats the function of block 710. If it was depressed, it returns to block 704 and cycles until the keyboard key switch is moved to the "on" position at which time the CPU sets the output signals used to turn on dispenser power relays to "on" (block 714). It also initializes the pass bit to indicate that this is the first pass through the loop. Next, the CPU clears the CRT display buffer area and writes the on-line display data into this area. The CRT circuit will update the display from this buffer as the cursor makes its passes. It then waits for approximately two seconds to allow hardware settling before proceeding as indicated by block 716.

Next, the CPU sets up all addresses and address pointers to the location of the first dispenser's data in RAM and then interrogates the keyboard to determine its status and saves this status information in RAM (block 718). The CPU checks the keyboard status bits in RAM (block 720) for the condition of the emergency switch 114 and the key lock switch 112. If there is no emergency (i.e., switch 114 not actuated by the operator) and the key switch is still on, the CPU proceeds to perform the function of block 728 as discussed below. If one of these switches has been actuated, the CPU determines first whether the emergency switch was the called function (block 722). If not, the key switch was called and the CPU returns to block 704. If an emergency, exists, however, the CPU disarms all dispensers and sets all the remote pump signals and the signal for the dispenser power relays to "off" and turns off the light behind the emergency switch (block 724). It stays in this state while continuing to monitor the keyboard until the emergency switch is reset.

When the emergency switch is reset, all signals to remote pumps are reset to the original state and dispenser power relays are set to "on" and the light behind the emergency switch is turned on. The CPU waits one second (block 726) for hardward settling and CPU outputs all the data to the displays at the pumps that was there previous to power off before commanding all remote dispensers to resume operation in the state they were in prior to the emergency via the party line 325 (FIG. 8).

The CPU then checks the pass bit (block 728) to determine if it is an initial pass. If it is, the CPU writes the price per unit volume and hose numbers into the RAM display buffer for display on CRT and transmits all price per unit volume, volume and total sale data to the dispensers (block 730). If for display and not an initial pass, the CPU checks for keyboard arm signals (set by switches 118) for the dispenser called for by the address pointers dispenser and if a dispenser is armed and transmits price per gallon and any limit on gallons due to the allocation limit set in the off-line mode or the prepay gallon equivalent of the dollar or gallon value called for in the prepay mode. The CPU also requests and receives the handle and valve and motor status from the dispenser and stores these status bits in RAM. These functions are indicated by block 732.

The CPU then checks the status bits stored in RAM (block 734) to determine if the handle is "on" or if a dispenser is armed and if so, it proceeds to request and receive the volume and cost of sale data from the dispenser and stores it in RAM (block 736).

If the handle is "off" or a dispenser not armed, the CPU checks to see if the dispenser display switch has been depressed and if it has, checks to see if the cash or credit switches have been depressed. If they have been depressed, it updates all totals and clears the dispenser CRT RAM buffers and, therefore, the CRT on the next cursor pass to zero (block 738). If any one of these does not occur, the CPU checks to see if the address pointers indicate all dispensers have been processed (block 740). If not, the CPU updates address pointers to the next dispenser to be serviced (block 742) and returns to block 728. If all dispensers have been processed, the CPU checks the status of the key switch and the emergency switch (block 744). If either switch has been actuated, the CPU proceeds with the function indicated by block 756 and discussed below. If neither has occurred, the CPU determines if the shift switch has been depressed (block 746) and if so, proceeds with the function indicated by block 747 discussed below. If not, the CPU determines if the inventory switch has been depressed (block 748) and if so, proceeds with the function indicated by block 749 discussed below. If not, the CPU determines if the "clear" switch has been depressed (block 750) and if so, proceeds to the function indicated by block 751 discussed below. If not, the CPU determines if prepay data has been entered via the keyboard (block 752) and if so, proceeds to the function indicated by block 753 also discussed below. If not, the CPU checks the RAM status registers and turns on the signals for the appropriate remote pumps. It also determines from these bits if a sale has been consummated or if a customer is indicated at an unarmed dispenser. In either case, it turns on the cash drawer release or customer alert warning respectively. Finally, the CPU sets the pass bits to noninitial pass and returns to perform the function indicated by block 718.

Returning now to the function of block 744, if the key switch has been moved to the "off" position or the emergency switch actuated, the CPU disables the interrupts and sets the dispenser power relay control signal and all remote pump control signals to "off" (block 756). The CPU then reads the key switch 112 (block 758) and if it is off, returns to perform the function indicated by block 706. If not, the CPU checks to see if the "clear" switch (113) has been depressed (block 760) and if it has not, checks the emergency switch (block 764) and if it is still actuated, returns to the function of block 760. If the "clear" switch has been actuated, the CPU clears all data from the CRT RAM display area (block 762) which results in a blank CRT display.

If the emergency switch is reset, the CPU sets the dispenser power relay control signal and the control signals for the remote pumps in use to "on" (block 766). It also sends the latest status and display information to each dispenser and sets the pass bit to initial before returning to the function indicated by block 716.

Returning now to block 746, if the shift switch 113 has been actuated, the CPU updates the last shift total with the station totals and shifts all shift totals to the next shift RAM buffers (block 747) and proceeds with the function indicated by block 754 discussed above. If an inventory request switch (not shown) has been actuated, the CPU stores the inventory totals in the RAM display area, as indicated by block 749, and proceeds to the function indicated by block 754. If the "clear" switch 113 has been actuated, the CPU disarms all unused dispensers (armed but no customer) but does not disarm a dispenser whose sale data is being viewed on the CRT. The CPU also clears any inventory information from the RAM display area (block 751). Finally, if prepay data has been entered by the operator, the CPU stores the prepay digit entered and sets the status of the prepay entry (i.e., how many digits, has the "enter" key been depressed, etc.), as indicated by block 753 and then proceeds to the function indicated by block 754.

Interrupts to update the data storage are generated internally by the CRT circuit 327 when each CRT sweep vertical retrace interval is initiated (thirty times a second). When an interrupt occurs, the CPU responds to the interrupt by saving the status of all registers. Also, the CPU takes all information that was stored in the main RAM display area and during the vertical retrace interval, stores this information in the CRT buffer RAM. The CRT buffer RAM maintains the information to be written automatically by the CRT display board. Also, the CPU restores all registers to the state they were in prior to interrupt and returns to the routine where interrupt occurred. This operation is indicated by the functional blocks 768, 770, 772 and 774.

Having described the operation of the central control for the embodiment shown in FIG. 2, a description of the operation of one of the identical dispensers, as shown in FIG. 9, is presented.

When power is applied to the dispenser, the dispenser CPU 410 (FIG. 9) begins a power-up routine setting its program counter to zero starting address. The first function of this routine is to set the outputs to the valves 249 and motors 248 off and blank the displays 243, 245 to allow these devices to settle for approximately one second. After this delay, the communications and display driver routines are initialized by setting their addresses into the correct RAM 414 locations. These functions are indicated by blocks 780 and 782 of FIG. 13.

The pump idle and diagnostic routine then control the CPU to set the valve and motor outputs to off, shutting these devices off, and check the UART 416 to ascertain if the operator console is requesting communications via the party line 325 (FIG. 8). These communications in the form of a series of 8-bit BYTES, identify the dispenser to or from which information is to be transferred and provide such data. This data includes status information, control information, as well as accumulated price and volume information. If communications are requested, the CPU 410 transfers the data between the dispenser and operator console through the UART. These functions are indicated by block 784 in FIG. 13.

After terminating communications, the CPU 410 checks the command buffer in RAM 414 to check if diagnostics was called for (block 786). If it was, the output test digit routine is run in which the digit selected by the operator is outputed via the party line and UART to each dispenser which displays the numeral called for as indicated by block 788. This numeral's code would have been stored in RAM as part of the data transfer of function 784 above. After displaying the numeral on all of the dispenser display digits, the sequence is repeated until the diagnostic command is no longer present, at which time the command buffer status bits are decoded and stored in the status buffer in RAM 414 (block 790).

Next, the CPU checks (block 792) the manual bit in the status buffer of the RAM to determine if the dispenser is to be in the manual or self-serve mode. If it is to be in the manual mode of operation, the CPU checks the "handle on" signal from the dispenser handle to determine its status (block 794). If it is not on, the idle communications routine of block 784 is repeated. If the handle is on, the CPU starts a software timer and zeros the display data buffers (block 796). Returning to block 792, if the dispenser is not set for the manual mode, the CPU checks the idle bit in the RAM status buffer to determine if this dispenser is in use. If not idle, it proceeds to initialize 8's timer and zero display data block 796. If the dispenser is idle, the routine returns to functional block 784.

Next, the system is ready for the dispensing of fuel. In this mode (block 798), the CPU 410 decrements the all 8's timer, sets the valve and motor signals "on", enables interrupts (pulses from flow pulser 225), checks communications and determines from RAM status buffer emergency bit whether the operation is a new delivery or continuation of a delivery interrupted by an emergency "off" signal from the operator. If the operation is a continuing delivery, the data storage areas are left intact with information received during the communications phase of the functions of block 784 and all digits are forced to all eights on the dispenser display.

If a new operation is initiated, data storage areas in ROM 412 are zeroed and the outputs of all 8's are applied to the displays. The CPU responds to pulse interrupts by adding the pulses to the volume data in RAM and calculating new dollar and gallon display information and storing it in the RAM buffers. The price per gallon data was loaded by the initial communications of functional block 784 above. This routine also checks for slow-down and if total gallons dispensed is within 0.3 gallons of the preset or allocation limit, provides a turn-off signal for the main valve. When the gallon value is equal to a preset or allocation limit, the slow flow valve is turned off. Also, the status of the handle is checked to verify that dispensing is to continue and the UART 416 has not received new commands to the contrary from the console. The CPU, of course, responds to any new UART or dispenser handle command.

Next, the CPU checks to ascertain if the all 8's timer has decremented to zero (block 800). If not, it continues the loop of functional block 798 discussed above. If it is zero, the CPU responds to interrupts (pulses from flow pulser 225) by adding pulses to volume data in RAM and calculating new gallon and dollar values and storing them in RAM (block 802). During this operation, the CPU updates the display every iteration through its internal loop thus displaying corrected output values. This routine also checks for a slow-down condition and if total gallons dispensed is within 0.3 gallons of preset or allocation limit, turns off the main valve signal. When the gallon value is equal to the present or allocation limit, the slow flow valve signal is also turned off. Also, the CPU continuously scans the UART and dispenser handle signals for change in status. It responds to the UART changes by communicating through UART to the control console unit. If a command is received from the UART or the dispenser handle is turned off, the CPU sets all valve and motor signals "off" and resets all status indicators in RAM status buffers (block 804). After a 0.5 second delay, the control returns to the idle routine of block 784. This completes the cycle of operation of the dispenser, each one of which is substantially identical and cooperates with the control console to periodically update the status of all dispensers as well as the data from the dispenser.

It will become apparent to those skilled in the art that various modifications to the preferred embodiments discloses herein can be made without departing from the spirit or scope of the invention as defined by the appended claims.

The embodiments of the invention in which an exclusive property or privilege is claimed are defined as follows.

1. A fuel dispensing system comprising an operator console including display means for displaying at a single location status information for dispensers of the system and a data entry keyboard for entry of data and command signals into the system, at least one fuel dispenser having an electronic display for displaying price per gallon, volume of fuel delivered and total cost of fuel delivered information to an operator and a dispenser control circuit coupled to said electronic display including a single flow pulser for generating signals representative of the volume of fuel dispensed therefrom, said dispenser control circuit including output circuit means coupled to said generating means for periodically providing an electrical signal comprising at least one binary word including dispenser status information and volume of fuel dispensed information; said dispenser control circuit further including input circuit means responsive to an input electrical signal comprising at least one binary word for controlling the status of said dispenser; means for coupling said dispenser control circuit to said operator console; said operator console including a central processing unit (CPU), a memory, and interface circuit means for coupling said CPU to said display means, to said data entry keyboard and to said dispenser control circuit, said memory comprising a control means for controlling the operation of said CPU to transfer and process data related to the dispensing of fuel by said at least one dispenser including volume data from said volume representative signals between said display means, said data entry keyboard and said dispenser control circuit of said at least one dispenser, and to generate binary input words applied to said input circuit means of said dispenser control circuit for controlling the operation of said dispenser.

2. The system as defined in claim 1 wherein said CPU, said memory and said interface circuit means are mounted on circuit boards coupled to a common bus line providing electrical interconnection of these circuits.

3. The system as defined in claim 2 wherein said display means comprises a CRT.

4. The system as defined in claim 3 wherein said means for coupling said dispenser control circuit of said at least one dispenser to said operator console includes conductor means extending between said dispenser control circuit and said operator console and terminated at each opposite end by an optical isolator circuit, and a universal asynchronous receiver transmitter circuit coupled between each of said optical isolator circuits and said operator console and said dispenser control circuit.

5. The system as defined in claim 4 including a plurality of dispensers each including a dispenser control circuit and wherein each of said control circuits includes dispenser display means for displaying information pertaining to the volume of fuel dispensed by said dispenser.

6. The system as defined in claim 1 wherein each of said dispenser control circuits includes a dispenser CPU and a dispenser memory controlling said dispenser CPU for controlling the operation of said dispenser CPU to transfer and process data related to the dispensing of fuel and to supply accumulated volume and dollar of sale information to said operator console and to said dispenser display means.

7. The system as defined in claim 6 wherein said coupling means comprises a party line for coupling said operator console in parallel with each of said control circuits of said dispensers and wherein said operator console includes means for generating a series of codes uniquely identifying each dispenser of the system and wherein each of said dispensers are identified by a unique code and transfer data on said party line in response to interrogation by said operator console in response to the receipt of said unique code.

8. In a dispenser system for controlling and monitoring a dispensing operation including dispensing means including dispenser control means for controlling the dispensing of materials from said dispensing means, said dispenser control means having means for generating electrical signals representative of the amount of material dispensed; and an operator console remotely positioned from said dispensing means, said operator console including display means for displaying data relating to the dispensing of material, data entry means permitting the operator to enter commands for controlling the operation of said dispensing means and control circuit means coupled to said display means and said data entry means and responsive to signals from said data entry means for controlling said dispensing means, wherein the improvement comprises: said control circuit means includes a central processing unit and interface circuit means coupling said central processing unit to said display means, to said data entry means and to said dispenser control means wherein said central processing unit transfers and processes data between said dispenser control means and said operator console for periodically updating display information during operation of said dispensing means, and controlling said dispensing means in response to operator commands entered by said data entry means, wherein said dispensing means includes a plurality of dispensers, each of which includes a dispenser central processing unit and associated memory means for controlling said dispenser central processing unit to respond to electrical signals from said operator console and from said generating means; and wherein said system further includes a common party line coupling said central processing unit of said operator console to each of said dispenser central processing units, and wherein said operator console includes a UART and means coupling said central processing unit to said party line through said UART and wherein each of said dispensers includes a dispenser UART and means coupling the dispenser central processing unit to said party line through said dispenser UART.

9. The system as defined in claim 8 wherein said coupling means comprises optical isolator circuits coupling said party line to a UART at opposite ends of said party line.

10. The system as defined in claim 9 wherein each of said dispensers includes display means coupled to said dispenser central processing unit for providing a display of material dispensed information.

11. A self-service fuel dispensing system providing a central control and display for a plurality of dispensers comprising:

a plurality of dispensers each including fuel pumping means and means for selectively actuating said pumping means for dispensing fuel, each of said dispensers further including means for generating electrical signals representative of the flow of fuel from said dispensers; and a central control including display means for displaying dispenser data to an operator, a central processing unit, and circuit means including a data entry keyboard and storage means for controlling said central processing unit for on-line and off-line modes of operation wherein said circuit means is coupled to each of said dispenser actuating and generating means such that during on-line operation, an operator can control the operation of each of said dispensers and monitor the dispenser status on said display means and during off-line operation, said dispensers are deactuated and said central control provides information to be displayed to the operator for prompting operation of the keyboard for selectively recalling stored inventory information to be displayed to the operator by said display means.

12. The system as defined in claim 11 wherein said display means comprises a CRT.

13. The system as defined in claim 12 wherein said storage means comprises a memory for storing control sequence commands for controlling said central processing unit in a predetermined manner.

14. The system as defined in claim 13 wherein each of said dispensers further include a dispenser central processing unit having a memory for controlling the operation of said dispenser central processing unit and coupling circuit means coupling said dispenser central processing unit to said central processing unit of said central control, said dispenser central processing unit coupled to said dispenser actuating and generating means and responsive to signals from said central control for controlling the operation of said dispenser.

15. A gasoline dispensing system comprising:

a plurality of dispensers for dispensing gasoline therefrom and including circuit means for generating digital data representing the volume of gasoline dispensed therefrom;

an operator console for controlling the operation of said plurality of dispensers wherein said operator console includes a display screen for simultaneously displaying the status of each of the dispensers and gasoline flow information through each of said dispensers;

a data entry keyboard coupled to said central processing unit permitting an operator to control the operation of and determine the status of each of said dispensers for receiving information to be displayed on said screen;

a plurality of coupling means for coupling said operator console to each of said dispensers to enable transmission of control and data signals between said operator console and each of said dispensers; and data processing circuits including a central processing unit and controlling memory operatively coupled to said operator console and to each of said dispensers for performing calculations on data supplied by said dispensers indicating the volume of fluid dispensed by the dispensers.

16. A gasoline dispensing system as defined in claim 15 wherein each fluid dispenser includes:

a pump for moving the gasoline from storage tanks;

a valve means including a hose and a nozzle coupled to said pump for directing the gasoline flow; and control circuit means coupled to said central processing unit and to said circuit means and responsive to signals therefrom for arming the dispenser in response to signals from said operator console permitting operation of said pump and said valve, said control circuit means including display means for displaying volume of gasoline dispensed information.

17. A gasoline dispensing system as defined in claim 16 wherein said display screen comprises a cathode ray tube and said central processing unit actuates said cathode ray tube display for providing a display format including:

a first column identifying each gasoline dispenser;

a second column indicating the price per gallon of gasoline associated with each dispenser;

a third column indicating the arming status of each dispenser;

a fourth column indicating the operating condition of each dispenser as controlled by the dispenser;

a fifth column indicating operation of the pump associated with each dispenser;

a sixth column indicating the completion of a dispensing function for each dispenser; and a seventh column indicating payment received for the gasoline dispensed by each dispenser.

18. A gasoline dispensing system as defined in claim 17 wherein said data processing circuits are incorporated in said operator console which includes coupled to a common bus, a control processing unit defined by electrically interconnected storage registers, an accumulator, a parallel arithmetic unit, a program counter, a stack pointer and a clock; a memory unit having a random access memory and address decoding logic for providing random access memory for storing information and a read-only memory with address decoding logic for providing control of data, and a plurality of read-only memories programmed to provide controlling functions for said central processing unit; an interface circuit for providing a two-way interface between said central processing unit and said cathode ray tube display and said data entry keyboard; a dispenser communication interface module associated with each dispenser and including a universal asynchronous receiver-transmitter for receiving series data and outputing parallel data; and power supply means for supplying positive and negative regulated DC voltage for operation of the system.

19. A gasoline dispensing system as defined in claim 18 wherein each of said dispenser communication interface modules includes an electrical-optical isolator circuit for electrically isolating said dispenser from said operator console.

20. A gasoline dispensing system as defined in claim 19 wherein said circuit means for generating digital data representing the volume of gasoline dispensed includes:

a light chopping disc rotationally coupled to said pump and having a plurality of notches for passing light;

a pair of spaced light sources positioned on a first side of said light chopping disc for emitting light in a direction to pass through said notches of said chopping disc;

light detection means positioned on a second side of said light chopping disc for receiving light passing through said light chopping disc; and a logic circuit coupled to said light and detection means and responsive to pulses from said light detection means to provide signals representative of the actual flow of gasoline delivered through said hose and for inhibiting the generation of such signals due to jitter.

21. The gasoline dispensing system as defined in claim 15 wherein each of said dispensers further includes a central processing unit coupled to said circuit means and to said coupling means for transferring data and control signals between said dispenser and said operator console.

22. A fuel dispensing system comprising an operator console including console display means for displaying at a single display status information for dispensers of the system and a data entry keyboard for entry of data and command signals into the system including data signals representative of a predetermined amount of fuel, a plurality of fuel dispensers each having a flow pulser for generating signals representative of the volume of fuel dispensed therefrom, a dispenser central processing unit (CPU) including memory means for storing data including price per unit volume of fuel dispensed, said dispenser CPU coupled to said flow pulser for receiving signals therefrom and responding to said signals to compute the accumulated volume and sales price information, an electrical dispenser display means coupled to said dispenser CPU for displaying said price per unit volume, accumulated volume and sales price information to an operator, wherein said operator console includes an operator CPU and associated memory, means for coupling said dispenser CPU to said operator console and interface circuit means for coupling said CPU to said console display means, to said data entry keyboard and to said coupling means, said memory controlling the operation of said operator CPU to transfer and process data related to the dispensing of fuel by said dispensers including accumulated volume and sales price data from said dispenser CPU and controlling the operation of each of said dispensers by responding to operator commands entered into said data entry keyboard.

* * * * *